(12) United States Patent
Swales et al.

(10) Patent No.: US 6,233,626 B1
(45) Date of Patent: May 15, 2001

(54) SYSTEM FOR A MODULAR TERMINAL INPUT/OUTPUT INTERFACE FOR COMMUNICATING MESSAGING APPLICATION LAYER OVER ENCODED ETHERNET TO TRANSPORT LAYER

(75) Inventors: Andrew G. Swales, Windham, NH (US); A. Dean Papadopoulos, Groton; Allan Tanzman, Newton Centre, both of MA (US)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 09/166,870

(22) Filed: Oct. 6, 1998

(51) Int. Cl.[7] .............................. G06F 3/00; G06F 13/00
(52) U.S. Cl. ................... 710/11; 710/11; 710/62
(58) Field of Search .......................... 370/94; 364/242; 710/52, 11, 62, 63, 105

(56) References Cited

U.S. PATENT DOCUMENTS

| | | |
|---|---|---|
| 3,971,000 | 7/1976 | Cromwell . |
| 4,319,338 | 3/1982 | Grudowski et al. . |
| 4,688,167 | 8/1987 | Agarwal . |

(List continued on next page.)

FOREIGN PATENT DOCUMENTS

| | | |
|---|---|---|
| 296 00 609 U 1 | 3/1997 | (DE) . |
| 441 0 171 C1 | 4/1997 | (DE) . |

(List continued on next page.)

OTHER PUBLICATIONS

"Internet Protocol, Darpa Internet Progam, Protocol Specification—RCF:791," *Defense Advanced Research Projects Agency*, Sep. 1981.

(List continued on next page.)

Primary Examiner—Thomas Lee
Assistant Examiner—Chun Cao
(74) Attorney, Agent, or Firm—Michael J. Femal; Larry I. Golden

(57) ABSTRACT

A communications adapter is provided for interfacing between a master device and an I/O device (body) having an output and/or an input. In the case of the I/O body having an output, the adapter has a TCP port for coupling to the master device via a transmission path for receiving a request message. The adapter also has a connector for operable coupling to the I/O device for receiving the output of the I/O device. The adapter further has an interface circuit operably connected to the TCP port and the connector for transmitting a response message over the transmission path in response to the request message, the response message correlating to the output received from the I/O device. The request message and the response message is limited to a length that is less than a TCP transaction length and/or a maximum transmission unit limit, or both, depending on the embodiment of the present invention.

A method is also provided to create a connection between a master device and an I/O device having an output and/or and input. In the case of the method for providing a connection between a master device and an I/O device having an output, the method includes receiving over a transmission path a request message on a preregistered TCP port selected from a plurality of TCP ports. The method also includes receiving the output from the I/O device. The method further includes transmitting a response message over the transmission path in response to the request message, the response message correlating to the output of the I/O device. The request message and/or the response message is limited to a length that is less than both a TCP transaction length and/or a maximum transmission unit limit, or both, depending on the embodiment of the present invention.

18 Claims, 3 Drawing Sheets

Microfiche Appendix Included
(1 Microfiche, 44 Pages)

U.S. PATENT DOCUMENTS

| | | |
|---|---|---|
| 4,845,644 | 7/1989 | Anthias et al. . |
| 4,858,152 | 8/1989 | Estes . |
| 4,897,777 | 1/1990 | Janke et al. . |
| 4,912,623 | 3/1990 | Rantala et al. . |
| 4,937,777 | 6/1990 | Flood et al. . |
| 4,949,274 | 8/1990 | Hollander et al. . |
| 4,953,074 | 8/1990 | Kametani et al. . |
| 4,992,926 | 2/1991 | Janke et al. . |
| 5,012,402 | 4/1991 | Akiyama . |
| 5,023,770 | 6/1991 | Siverling . |
| 5,047,959 | 9/1991 | Phillips et al. . |
| 5,072,356 | 12/1991 | Watt et al. . |
| 5,072,412 | 12/1991 | Henderson, Jr. et al. . |
| 5,109,487 | 4/1992 | Ohgomori et al. . |
| 5,122,948 | 6/1992 | Zapolin . |
| 5,131,092 | 7/1992 | Sackmann et al. . |
| 5,134,574 | 7/1992 | Beaverstock et al. . |
| 5,151,896 | 9/1992 | Bowman et al. . |
| 5,151,978 | 9/1992 | Bronikowski . |
| 5,157,595 | 10/1992 | Lovrenich . |
| 5,159,673 | 10/1992 | Sackmann et al. . |
| 5,161,211 | 11/1992 | Taguchi et al. . |
| 5,165,030 | 11/1992 | Barker . |
| 5,179,700 | 1/1993 | Aihara et al. . |
| 5,225,974 | 7/1993 | Mathews et al. . |
| 5,245,704 | 9/1993 | Weber et al. . |
| 5,251,302 | 10/1993 | Weigl et al. . |
| 5,283,861 | 2/1994 | Dangler et al. . |
| 5,297,257 | 3/1994 | Struger et al. . |
| 5,307,463 | 4/1994 | Hyatt et al. . |
| 5,321,829 | 6/1994 | Zifferer . |
| 5,349,675 | 9/1994 | Fitzgerald et al. . |
| 5,398,336 | 3/1995 | Tantry et al. . |
| 5,406,473 | 4/1995 | Yoshikura et al. . |
| 5,420,977 | 5/1995 | Sztipanovits et al. . |
| 5,430,730 * | 7/1995 | Sepulveda-Garese ............... 370/94 |
| 5,440,699 | 8/1995 | Farrand et al. . |
| 5,446,868 | 8/1995 | Gardea et al. . |
| 5,528,503 | 6/1996 | Moore et al. . |
| 5,598,536 | 1/1997 | Slaughter, III et al. . |
| 5,613,115 | 3/1997 | Gihi et al. . |
| 5,623,652 | 4/1997 | Vora et al. . |
| 5,625,781 | 4/1997 | Cline et al. . |
| 5,699,350 | 12/1997 | Kraslavsky . |
| 5,734,831 | 3/1998 | Sanders . |
| 5,805,442 | 9/1998 | Crater et al. . |
| 5,950,006 | 9/1999 | Crater et al. . |
| 5,975,737 | 11/1999 | Crater et al. . |
| 5,982,362 | 11/1999 | Crater et al. . |
| 5,997,167 | 12/1999 | Crater et al. . |
| 6,028,866 * | 2/2000 | Engel et al. ..................... 370/461 |
| 6,058,251 * | 5/2000 | Okamoto et al. .................. 364/240 |

FOREIGN PATENT DOCUMENTS

| | | |
|---|---|---|
| 0 542 657 A1 | 5/1993 | (EP) . |
| 0 814 393 A1 | 12/1997 | (EP) . |
| 60-192447A * | 9/1985 | (JP) .................................. 715/811 |
| WO 97/18636 | 5/1997 | (WO) . |
| WO 98/53581 | 11/1998 | (WO) . |

OTHER PUBLICATIONS

"Transmission Control Protocol, Darpa Internet Program, Protocol Specification—RCF:793," *Defense Advanced Research Projects Agency*, Sep. 1981.

"Open MODBUS/TCP Specification," A. Swales, Sep. 3, 1997.

"[comp.unix.programmer] Unix–Socket–FAQ For Network Programming," Vic Metcalfe, Andrew Gierth and other contributors, Jan. 22, 1998.

"Winsock 2 Information," Bob Quinn, 1995–1998 (last updated Dec. 5, 1998).

Using World–Wide Web for Control Systems,, F. Momal, C. Pinto–Pereira, AT Division CERN, 1211 Geneva 23, http://mish231.cem.ch/Docs/ICALEPCS/1995/icalep95.htm.

When Technology Standards Become Counterproductive, Kenneth C. Crater, President, Control Technology Corporation, Hopkinton, MA dated Jul. 9, 1999, pp. 1–5.

A White Paper State Language for Machine Control, Kenneth C. Crater, President, Control Technology Corporation, Hopkinton, MA dated Jul. 9, 1999, pp. 1–11.

New PC–based Process Control & Data Acquisition Software Integrates Remote Internet Capabilities with Fast Pentium Support, Fred A. Putnam, LABTECH President, pp. 1–3.

Aug. 1996 Control Magazine—In The News—Electric Utility Industry Embarks on Automation Overhaul, pp. 1–10.

Jul. 1997 Control Magazine—Magazine Software Review—NT Package Give Plant Access Through the Web, pp. 1–3.

Oct. 1996 Control Magazine—Software Review—Article Archives, pp. 1–2.

ICS Intrumentation & Control Systems—Windows NT for real–time control: Which way to go?—ICS Magazine, pp. 1–8.

I&CS Jul. 1999—Special Report Software—Software: Open source OSs, objects, Web–basd communications challenge status quo, (Wayne Labs, Senior Technical Editor), pp. 24–49.

Landis & Staefa MS 2000, pp. 1–2.

Landis & Staefa Standards and Open Protocols Integration System Architecture, p. 1.

Annabooks Bookstore, Programming and Interfacing the 8051, by Sencer Yeralan and Asutosh Ahluwalia, p. 1–2.

SoftPLC Corporation—Java Support in SoftPLC Corp. Products, pp. 1–5.

Mach J. Company, MachJ, an enbeddable, clean room Java Virtual Machine, p. 1.

SoftPLC Corporation—The History of Programmable Controllers, Looking Back From the Year 2000 A.D. (Or, How Computers Replaced Proprietary PLC'S), pp. 1–7.

SoftPLC Corporation—TOPDOC: Advanced PLC program development & documentation software, pp. 1–12.

Control Engineering Online Magazine Articles (Jul. 1998)—No. that's not a PC, it's a PLC, pp. 1–2.

Rockwell International Corporation, Allen–Bradley Introduces PLC–5/80E Controller for Ethernet Communication Networks.

Rockwell Automation—Search Results, pp. 1–2.

Rockwell International Corporation, Vision & Direction, The Direction of Automation Systems, pp. 1–4.

Rockwell International Corporation, Vision & Direction, The Role of Open Systems, pp. 1–4.

Rockwell International Corporation—Vision & Direction—The Direction of Automation Systems—Emergence of Application–Specific Control Solutions, pp. 1–2.

Rockwell International Corporation—Vision & Direction—The Direction of Automation Systems—The New Factory Worker, pp. 1–2.

Rockwell International Corporation, Vision & Direction, Control System Deliverables—The Next Step, pp. 1–2.

Rockwell International Corporation, Vision & Direction, Conclusion & Acknowledgments, pp. 1–2.

Rockwell International Corporation—Choices—Perspectives on the Future of Automation Control, p. 1.

Rockwell International Corporation—Allen–Bradley—Networks—Ethernet for Industrial Control—An Ethernet White Paper—Apr. 21, 1998, pp. 1–13.

Rockwell International Corporation—Automation Systems Control—General—World–Class Automation Systems from Allen–Bradley, Last Updated: May 7, 1998, pp. 1–12.

PC Quest, Dec. '97—Point, click, Control—C–Programmable controllers take the pain out of embedded control, pp. 1–2.

berthel—automation with imagination—PCI 100—Programmable logic controller for SIMATIC/IBM IPC, pp. 1–3.

YAHOO! Personalized Search Results for programmable logic controller internet access, pp. 1–3.

SIEMENS—SIMATIC report Jan. 1997—New in SIMATIC Library, pp. 1–2.

Control Magazine Aug. 1998—Field Test—Dynamic Software Makes Control Integration Easier, pp. 1–2.

Engineering Information, Inc.—Ei CPX WEB [1990–94].

"Ethernet Base Gateway Product," AEG–Modicon, published 1991.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB–TCP Installation and Progamming Manual," Niobrara Research and Development Corporation, Oct. 1, 1997.

Website Information of PROFIBUS: Technical Overview.

Website Information of ODVA—The Open DeviceNet's Vendor Association.

Website of PROFIBUS International—Welcome Page.

LabView Graphical Programming for Instrumentation, Networking Reference Manual, ® Copyright 1993, 1994 National Instruments Corporation, Part No. 320587B–01, Sep. 1994.

LabView Graphical Programming for Instrumentation, Tutorial for Windows, ® Copyright 1993, 1994 National Instruments Corporation, Part No. 320593B–01, Sep. 1994.

Abstract of "Implementing distributed controls for FMC's using Internet utilities," S. S. Jagdale and N. Merchant; Computers of Industrial Engineering, vol.. 31 No. 1–2, p. 87–90; Oct. 1996 (UK).

Abstract of "Process Control takes to the Net," Greg Paula; Mechanical Engineering vol. 118 No. 12 Dec. 1996, p. 55.

Abstract of "Remote interrogation and control of sensors via the internet," Peter L. Furh and Euan F. Mowat; Sensors, vol. 12 No. 12, 6 pp; Dec. 1995.

Abstract of "Process control takes to the Net," G. Paula; Mechanical Engineering, vol. 118, No. 12, p. 55, Dec. 1996.

Abstract of "Implementation of CAN/CAN bridges in distributed environments and performance analysis of bridged CAN systems using SAE benchmark," H. Ekiz, A. Kutlu and E. T. Powner; Conference Paper, IEEE Southeastern '97, Engineering the new energy, IEEE, pp. 185–187, 1996.

Abstract of "Managing interdisciplinary project teams through the Web," R. E. Goodman and P. Chinowsky; Conference Paper, WebbNet 96—World Conference of the Web Society, pp. 180–185, 1996.

Abstract of "Learning environment for a process automation system using computer networks," J. Lindfors, L. Yliniemi and K. Leivska; Conference Paper, Step '96—Genes, Nets and Symbols, pp. 137–143, 1996 (Finland).

Abstract of "Distributed agent systems for intelligent manufacturing,"D. H. Norrie and B. R. Gaines; Canadian Artificial Intelligence, No. 40, pp. 31–33, Autumn 1996 (Canada).

Abstract of Proceedings of AUTOFACT 1995 Conference, "Today's Automated, Integrated Factory," Soc. Manuf., Eng., Dearborn, MI; 1995.

Abstract of "The ECOSSE Control HyperCourse," C. M. Merrick and J. W. Ponton; Computers & Chemical Engineering, vol. 20, Part B, p. S 1353–1358, 1996 (UK).

Abstract of "Chemical–better batch controls," T. Crowl; Contorl & Instrumentation, vol. 28, No. 5, pp. 53–54, May 1996 (UK).

Abstract of "Industrial software does 32–bit Windows, prepares for the net," W. Labs; I 8CS, vol. 69, No. 3, pp. 23–26, 31–34, Mar. 1996, USA.

Abstract of "A case study for international remote machining;" G. C. I. Lin and Kao Yung–Chou; Conference Paper, Proc. SPIE–Int. Soc. Opt. Eng., vol. 2620, pp. 553–560, 1995.

Abstract of "Standardization of long–distance protocols," R. Dinges; Journal Paper, Generation Changes in Network Conductor Systems, ITG—Fachberichte, vol. 134, pp. 97–113, 1995 (West Germany).

Abstract of "Proceedings of AUTOFACT Conference," Soc. Manuf. Eng.,, 684 pp., Dearborn, MI; 1993.

Abstract of "Control system design V. Communications orchestrate process control," F. Glow; In Tech, vol. 36, No. 9, pp. 68–74, Sep. 1989.

Abstract of "Functions and characteristics of local networks adapted to industrial applications," J. Morlais; Electronique Industrielle, No. 97, pp. 56–63, Nov. 15, 1985; France.

Abstract of "Intelligent supervisory control of submerged–arc furnaces," Markus A. Reuter, Carla Pretorius, Chloe West, Peter Dixon and Morne Oosthuizen, JOM vol. 48, No. 12, Dec. 1996, pp. 49–51.

Abstract of "Simulation on the integration of process control systems of rolling mill plants through standard networks, "Choo Young Yeol, Hwang Hwa Won and Kim Cheeha, Proceedings of the Industrial Computing Conference, Instrument Society of America, Research Triangle Park, NC, USA. pp. 1–14; vol. 6, No. 1, 1996.

Abstract of "Environmental waste control digest," Clayton H. Billings; Public Works vol. 127 No. 7, 6 pp, Jun., 1996.

Abstract of "Experiments in tele–handling and tele–machining at the macro and micro scales, using the Internet for operational environment transmission," Mamoru Mitsuishi, Toshio Hori, Tomoharu Hikita, Masao Teratani, Takuro Watanabe, Hirofumi Nakanishi and Bruce Kramer; IEEE International Conference on Intelligent Robots and Systems vol. 2, 1995.

Abstract of "A phototying and reverse engineering system for mechanical parts–on–demand on the national network," Fred Hansen, Elias Pavlakos, Eric Hoffman, Takeo Kanade, RJ Reddy, Paul Wright; Journal of Manufacturing Systems, vol. 12, No. 4, pp. 269–281; 1993.

Abstract of "Mathematical model and optimization of furfural treating process," Tao Peng, Jinshou Yu and Huihe Shao; Huadong Huagong Xueyuan Xuebao/Journal of East China Institute of Chemical Technology vol. 17 No. 1, pp. 99–104; Feb. 1991.

Abstract of User's Aspect of Telecommunication and Information Processing in Plant Factory; Hashimoto Yasushi (1); Journal of the Institute of Electronics, Information and Communication Engineers, vol. 78, No. 5, pp. 475–481, Fig. 3, Ref. 7, 1995. (Japan).

Abstract of "High–efficient application technology of DCS from the viewpoint of users," Oka Norihoto (1); Narita Tsutomu (1); (1) Yamatake–Honeywell Co., Ltd.; Otomeshon, vol. 40, No. 2, pp. 24–28, Fig. 5, Part 2, 1995. (Japan).

Abstract of Users' experience with software tools for process integration. General results; Stougie, L.; Roeterink, H.J.H.; Van Wijk, A.; Stikkelman, R.M.; Nov. 1996.

Abstract of "Integrated design and process technology. vol. 1;" Cooke, D.; Kraemer, B.J.; Sheu, P.C.Y.; Tsai, J.P.; Mittermeir, R.; Society for Design and Process Science, pp. 51–57; 1996. (USA).

Abstract of "Integrated design and process technology. vol. 2;" Tanik, M.M.; Bastani, F.B.; Gibson, D.; Fielding, P.J.; Society for Design and Process Science, pp. 423–430, 1996. (USA).

Abstract of "Integrated design and process technology. vol. 2" Tanik, M.M.; Bastani, F.B.; Gibson, D.; Fielding, P.J.; Society for Design and Process Science, pp. 306–312, 1996.

Abstract of "Need low–cost networking consider DeviceNet," W. H. Moss; InTech vol. 43:11; pp. 30–31, Nov. 1996.

"Plastic Car Bodies Pass the Crash Test," mechanical engineering; vol. 118, No. 12; Dec. 1996.

"Remote Interrogation and Control of Sensors via the Internet," Sensors and Systems; Peter L. Fuhr and Euan F. Mowat; University of Vermont; pp. 25–30; Dec., 1999.

* cited by examiner

SYSTEM FOR A MODULAR TERMINAL INPUT/OUTPUT INTERFACE FOR COMMUNICATING MESSAGING APPLICATION LAYER OVER ENCODED ETHERNET TO TRANSPORT LAYER

DESCRIPTION

This application contains a Microfiche Appendix consisting of 1 microfiche and 44 frames.

TECHNICAL FIELD

The present invention relates to input and output (I/O) terminal interfaces for communication between input and output field devices, and programmable logic controllers (PLCs), and for communication between input and output field devices, and other field master devices, such as a host device. More specifically, the present invention relates to a modular I/O terminal interface for communication over MODBUS encoded Ethernet to TCP.

BACKGROUND OF THE INVENTION

Within industrial automation systems market, there are various types of communications network protocols which were developed for products, such as PLCs, to run on the products to be networked together, and for the field devices to be monitored and controlled from various locations within the particular automation systems. Thus, various types of input and output communications devices have been produced to communicate within the various types of communications protocols for the various types of communications networks for the automation systems. For example, FIG. 2 shows various types of communications protocols, such as Interbus-S, Profibus DP, Modbus Plus, Echelon, Seriplex, CAN DeviceNet, CAN SDS, and CANCAL, to name only a few. An additional protocol is FIPIO. Each of these various communications network types require specific input and output devices for communication with the input and output field devices based on the various types of communications protocols each having specific and different communications requirements.

In addition, not only does each network protocol require different input and output communication devices for communication with the various above protocols, but there is also the need of having input and output communication devices for communication directly with the PLCs. Communication between the PLCs and the input and output communication devices can have yet another type of communication protocol which may require different types of input and output communication devices for each different type or brand of PLC.

The present invention is provided to solve these and other problems.

SUMMARY OF THE INVENTION

The present invention is a communications adapter for interfacing between MODBUS over Ethernet to TCP for the communication of information between field devices and a field master using these types of protocols. Field devices can include devices such as digital or binary inputs, digital or binary outputs, analog inputs, analog outputs, QPR units or other special units, and INTIO devices to name only a few. Field masters can include programmable logic controllers (PLCs) (sometimes referred to as process control devices or PCDs), application specific controllers, and host computers/devices such as a personal computer with industrial automation software running thereon. For example, U.S. Pat. No. 5,611,059 discloses various types of controllers within a control structure for interfacing with the field devices, as well as user interface of a personal computer having industrial automation software running thereon.

The communications adapter is for providing an interface between a master device and an I/O device (body) having an output and/or an input. In the case of the I/O body having an output, the adapter has a TCP port for coupling to the master device via a transmission path for receiving a request message. The adapter also has a connector for operable coupling to the I/O device for receiving the output of the I/O device. The adapter further has an interface circuit operably connected to the TCP port and the connector for transmitting a response message over the transmission path in response to the request message, the response message correlating to the output received from the I/O device. The request message and the response message is limited to a length that is less than a TCP transaction length and/or a maximum transmission unit limit, or both, depending on the embodiment of the present invention.

The present invention also includes a method for providing a connection between a master device and an I/O device having an output and/or and input. In the case of the method for providing a connection between a master device and an I/O device having an output, the method includes receiving over a transmission path a request message on a preregistered TCP port selected from a plurality of TCP ports. The method also includes receiving the output from the I/O device. The method further includes transmitting a response message over the transmission path in response to the request message, the response message correlating to the output of the I/O device. The request message and/or the response message is limited to a length that is less than both a TCP transaction length and/or a maximum transmission unit limit, or both, depending on the embodiment of the present invention.

In the case of the method for providing a connection between a master device and an I/O device having an input, the method includes receiving over a transmission path a request message on a preregistered TCP port selected from a plurality of TCP ports. The method also includes-transmitting a response message over the transmission path in response to the request message. The method further includes transmitting data to the input of the I/O device in response to the request message. The request message and/or the response message is limited to a length that is less than a TCP transaction length and/or a maximum transmission unit limit, or both, depending on the embodiment of the present invention.

The communications adapter (adapter or COM-adapter) attaches to an input/output body as is described U.S. Pat. No. 6,016,523 and/or German Patent No. DE 196 15 093, which are hereby incorporated by reference.

Specifically, the communications adapter is configured to directly attach to and communicate through at least an in-data port, the out-data port, and the identification port of the input/output body. In addition, the communications adapter is also configured to communicate with MODBUS over Ethernet type field masters. The communications adapter can have an input multiplexer for accepting data from the in-data port and from the identification port, an output multiplexer for providing data to the out-data port, and a processor for communicating with the input multiplexor and the output multiplexor. The processor is also provided for converting the data, received from the input multiplexor and the output multiplexor. Field bus circuitry is also connected between the processor and the field bus, within the communications adapter, for allowing the processor to communicate with the field master on the field bus.

Alternatively, the communications adapter has at least one application specific integrated circuit (ASIC) for accepting data from the in-data port and from the identification port, and for providing data to the out-data port. The ASIC converts the data to and from a MODBUS over Ethernet communications protocol of a PLC type of field master.

The present invention can take the form of a communications adapter adapted to only an input body or only an output body having the same advantages and the full input/output body, as is understood with reference to the incorporated references above. Thus, the invention allows inexpensive standard network components to be used in place of specialized real time field bus components in communicating with industrial sensor and actuator devices. This enables major savings in cost and complexity when connecting simple devices to a network solution involving programmable controllers or other industrial computer systems, since the same networking infrastructure components can be shared. Other advantages and aspects of the present invention will become apparent upon reading the following description of the drawings and detailed description of the invention.

DETAILED DESCRIPTION

Figure 1:
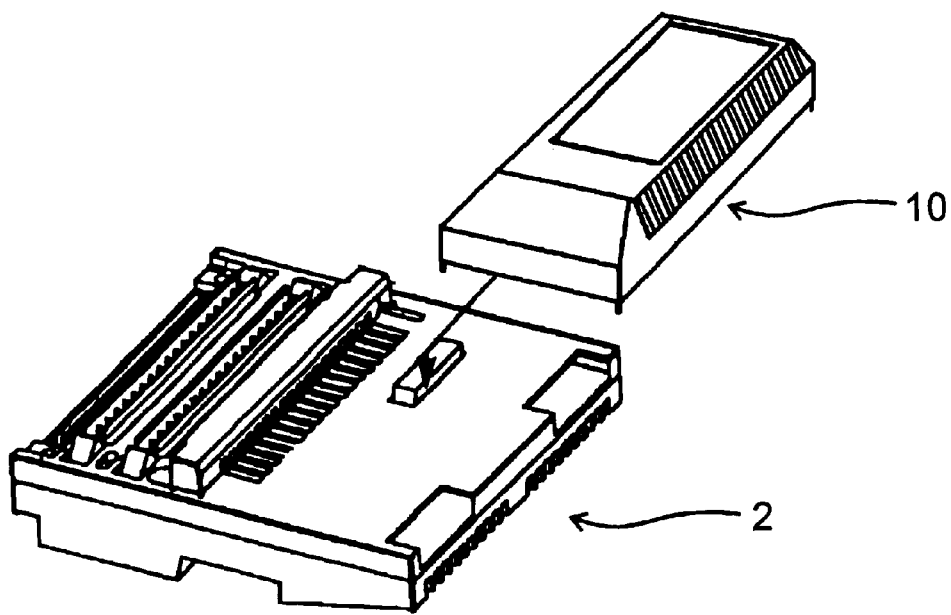
FIG. 1 is a perspective view of the input/output body, with the communications adapter of the present invention attached thereto.
Figure 2:
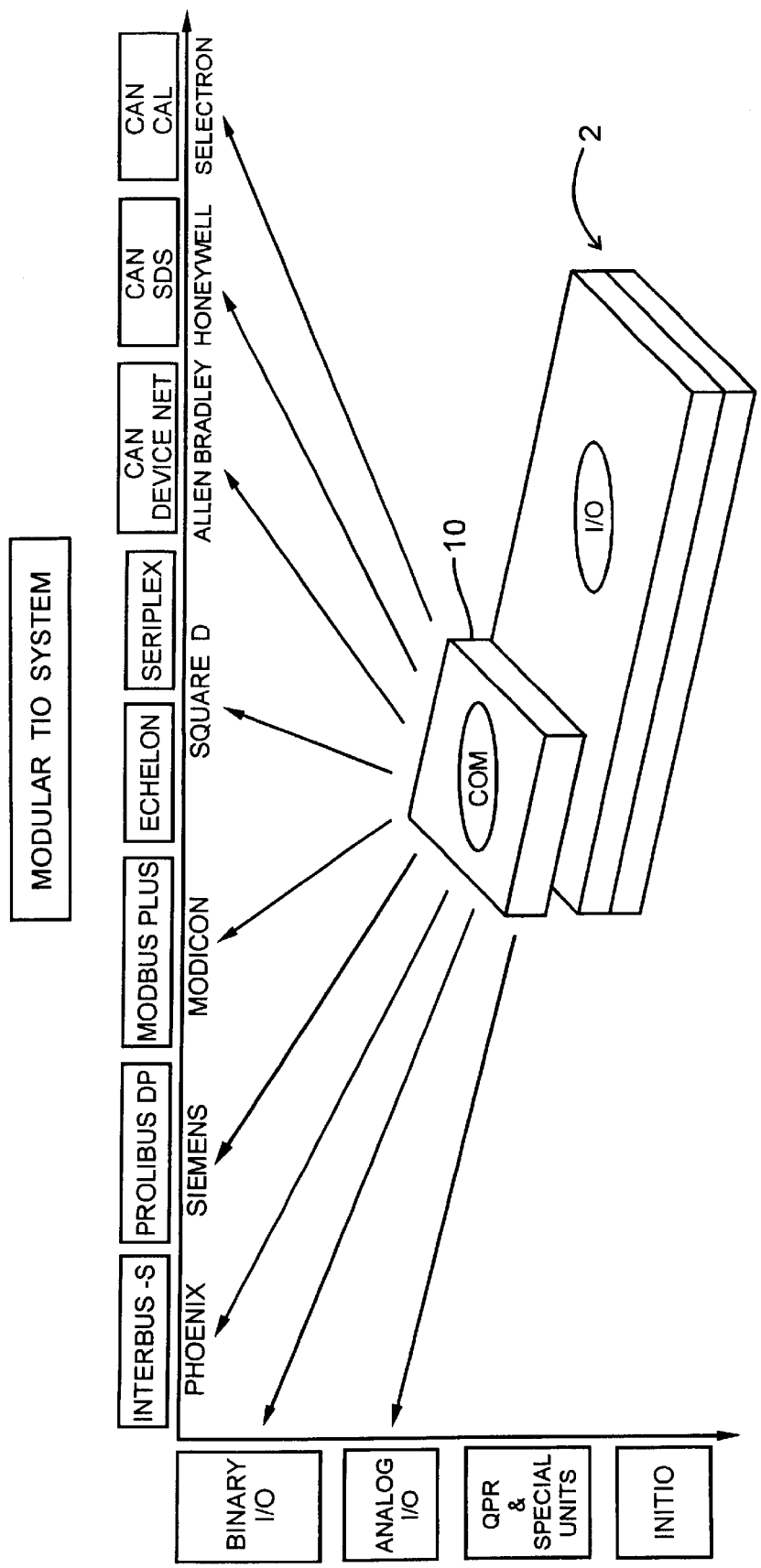
FIG. 2 is a modularity chart showing the flexibility of the present invention.
Figure 3:
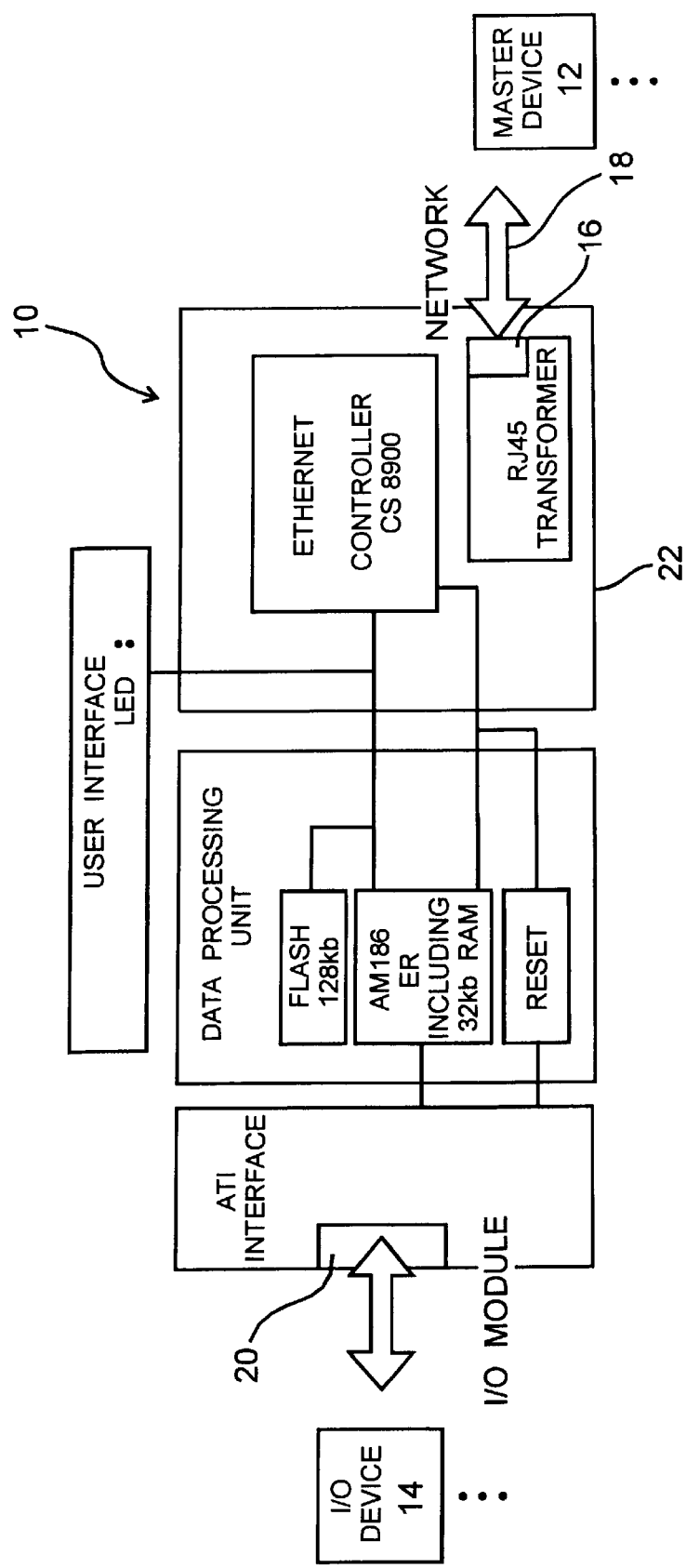
FIG. 3 is a block diagram of the internal structure of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiments illustrated.

With reference to FIG. 1, the present invention is a communications adapter (COM-adapter) for connecting to and communicating with an input/output (I/O) body 2. The I/O body 2 interfaces between field devices (not shown in FIG. 1) and a field master (not shown in FIG. 1). The communication adapter will allow an IO base (body) to reside on a Ethernet network and communicate using Modbus messages over the TCP/IP protocol.

Some abbreviations for this specification can be defined as follows:

MIO: Momentum Terminal Input Output

ARP: Address Resolution Protocol used to get Ethernet physical address, given the IP address MI-Interface: Momentum IO Internal Interface BOOTP: Protocol used at power up to associate a MAC address with an IP address COM-adapter Communication Adapter ICMP: Error indication and control protocol I/O-body: Input/Output body (base unit)

IP: Internet network layer providing worldwide addressing capability

Modbus: Messaging application layer (Read/Write services)

TCP: transport layer for point to point

STP: Shielded Twisted Pair

The COM-adapter 10 is for providing an interface between a master device 12 and an I/O device (body) 14 having an output and/or an input. In the case of the I/O device 12 having an output, the adapter 10 has a TCP port 16 for coupling to the master device 12 via a transmission path 18 for receiving a request message. The adapter 10 also has a connector 20 for operable coupling to the I/O device 14 for receiving the output of the I/O device 14. The adapter 10 further has an interface circuit 22 operably connected to the TCP port 16 and the connector 20 for transmitting a response message over the transmission path 18 in response to the request message, the response message correlating to the output received from the I/O device 14. The request message and the response message is limited to a length that is less than a TCP transaction length and/or a maximum transmission unit limit, or both, depending on the embodiment of the present invention.

The selected TCP port in the COM-adapter should be TCP port number 502 according to the design assumptions for one embodiment of the present invention, which are provided further below. In addition, the assumptions also provide that the interface circuitry ignores a connection request received over the transmission path by another TCP port. In addition, the interface circuitry discards a message of unknown meaning received by the TCP port. The interface circuitry closes the transaction path in response to an error received by the TCP port. In addition, the interface circuitry transmits an Address Resolution Protocol Response over the transmission path if an Internet Protocol address encoded with the request message matches an Internet Protocol address associated with the I/O device. The interface circuitry also transmits a connection confirmation in response to a TCP connection request.

The present invention also includes a method for providing a connection between a master device 12 and an I/O device 14 having an output and/or an input. In the case of the method for providing a connection between a master device and an I/O device having an output, the method includes receiving over a transmission path 18 a request message on a preregistered TCP port 16 selected from a plurality of TCP ports. The method also includes receiving the output from the I/O device. The method further includes transmitting a response message over the transmission path in response to the request message, the response message correlating to the output of the I/O device 14. The request message and/or the response message is limited to a length that is less than both a TCP transaction length and/or a maximum transmission unit limit, or both, depending on the embodiment of the present invention.

In the case of the method for providing a connection between a master device 12 and an I/O device 14 having an input, the method includes receiving over a transmission path 18 a request message on a preregistered TCP port 16 selected from a plurality of TCP ports. The method also includes transmitting a response message over the transmission path in response to the request message. The method further includes transmitting data to the input of the I/O device 14 in response to the request message. The request message and/or the response message is limited to a length that is less than a TCP transaction length and/or a maximum transmission unit limit, or both, depending on the embodiment of the present invention.

MODBUS is an industrial control protocol that is a widely-implemented standard where each transaction is independent and comprises a request message and response message pair, each of bounded length. The length of the request and response messages is such that the encapsulated message, when sent as part of a standard TCP connection, is smaller than both the TCP 'window' and Maximum Transmission Unit (MTU) limits. In addition, because the response from a previous transaction must be received before the request for the next transaction may be sent, there is no reason to break up, or 'fragment' a MODBUS message when transmitted over TCP. The result is that there is a direct relationship between the MODBUS message encoding and the TCP frame encoding on any given network.

By making a number of simplifying assumptions about the relationship between the target 'slave' device and its interrogating 'master' device, the obligations of the receiving software (See Appendix A) can be reduced from the traditional 'network protocol stack' consisting of a number of interacting software (See Appendix A) components to simpler 'state machine' where the correct response to an incoming request can be rapidly determined from the content of the start of the request message. For one embodiment of the present invention, the following are the significant assumptions:

All requests will be initiated at the 'master'. This means the slave has no need to initiate connections or resolve symbolic Domain Name Service (DNS) names.

All requests will appear on registered TCP port number 502, which is registered already with the Internet Assigned Numbers Authority (IANA) for the purpose of carrying MODBUS traffic. This means that attempted connection requests on other ports can be ignored.

The slave may assume that a valid return path to the master is either 'direct' or can use the network bridge device which last processed the request message on its way to the device. This means that it is no necessary to maintain IP routing tables or understand ICMP redirect messages.

It is appropriate if presented with a message of unknown meaning to discard the message as if the device is hiding behind a 'network firewall' device.

The appropriate response to any MODBUS protocol or encoding error is to unilaterally close the TCP connection.

As a result, the MODBUS/TCP/Ethernet implementation, as an example, can implement largely pre-calculated responses to the following messages:

Address Resolution Protocol (ARP) Request—send ARP response if IP address matches.

Internet Control Management Protocol Echo (ICMP PING) request—send PING response (to aid in standard network setup and troubleshooting).

TCP connection request (SYN)—send connection confirm (SYN ACK) if the requested port number is 502, ignore otherwise.

TCP disconnect request (FIN)—send disconnect confirm (FIN ACK).

MODBUS request as TCP data frame—send MODBUS response as TCP data frame, generating most of the protocol prefix information from the equivalent information in the request.

As a result, performance is enhanced in at least two significant respects as compared to a traditional implementation:

The amount of network traffic is reduced because each MODBUS transaction involves typically 2 messages only (the encoded request and response). A traditional protocol stack would generate 4 messages (adding an ACK message for each data unit transmitted). This results in a saving of 20% to 50% of the network traffic, allowing the same network components to handle an additional 25% to 100% throughput with no additional cost.

The calculation time at the slave is drastically reduced, allowing simpler and less expensive microprocessors to substitute for expensive ones and yet achieve the same effective response performance. At the same time, compatibility with conventional protocol stacks on large computers is maintained, because adherence to the standard encoding for MODBUS over TCP has not been violated.

In the present invention, the Ethernet (MAC) address for the COM-adapter can be stored in flash memory. The COM-adapter can operate on a standard ethernet network that should include a BOOTP server. The IP address will be obtained from a network server using the BOOTP protocol. A commercially available BOOTP server can be used for this purpose. The COM-Adapter communicates using Modbus messages over TCP/IP to an NOE2X1 module, a host computer, or any device using the Modbus Protocol over Ethernet. The COM-adapter will be compatible with at least, host programs running over Windows 95, Windows NT, and UNIX TCP/IP stacks. The COM-adapter should meet the main international standards: U.L., C.S.A., F.M., and C.E. The COM-adapter enables the connection of all MIO Boards to the Ethernet. Used with the COM-adapter, the MIO will provide at least the following functions: communication using a limited set of Modbus commands over the TCP/IP protocol; input and output data exchanges; parameter management (at initialization time and at run time); diagnostic information (LEDs, communications statistics); and downloading of new operating software (See Appendix A) over the Ethernet connection.

The external accesses to the Ethernet Comm Adapter are:

RJ45 female connector for 1OBaseT network connection.

2 LEDs:—Run: Green LED. Indicates the module's operating state.—Communication: Green LED: Indicates network activity.

The mode of operation is as follows:

Initialization: at power up, a kernel firmware (see Appendix A, which is hereby incorporated herein by reference) will perform an internal initialization and self-tests. If the self tests fail, a run LED will flash, if possible, indicating a failure reason. In this state, the COM-adapter does not attempt to communicate over the network. If initialization is successful, the COM-adapter then requests its IP parameters (IP address, default gateway, and sub-net mask) using the BOOTP protocol over the Ethernet network and the MAC address stored in a nonvolatile memory. The COM-adapter will wait ten seconds for a BOOTP server to respond before trying again. The COM-adapter will retry six times, three times using the Ethernet II framing type, and three times using the 802.2 SNAP header. If no server responds, the COM-adapter will use the last valid IP stored in flash memory. If no valid IP data exists, the COM-adapter will flash the run LED in a specified patten and retry the BOOTP request every thirty seconds. If the IP parameters are successfully obtained, the kernel (firmware) performs a checksum test on the executable image. If the image is invalid, the kernel will put the I/O base into a safe mode, flash the run LED with a pattern indicating its condition and wait for a download command sequence on the Ethernet port.

After receiving its network parameters, the COM-adapter runs an identification procedure with the I/O-body. If the Identification procedure fails, the Run LED flashes a failure code.

When the initialization phase is successfully completed, the COM-adapter is ready to communicate using the Modbus protocol over TCP/IP. The Run LED will be on steady.

The COM-adapter will enter the failed state if the I/OERR signal is pulled down by a complex I/O body for more than one second. If the I/OERR signal is pulled down by a simple I/O-Board, the COM-adapter remains in the ready state. The Run LED will indicate the failure condition and the I/O base will be forced into a safe state.

With respect to downloading, at any time after successfully obtaining its IP information, the COM-adapter will accept Modbus commands with function code 125 for downloading executive code. Downloading executive code should be understood in the art. When entering kernel software (See Appendix A), the unit will place the I/O in a safe state and enter the kernel. The Run LED will flash the code indicating that a download is in progress. During kernel downloading, only Modbus 125 commands will be accepted. When the download is complete, the COM-adapter will restart the initialization sequence. If the download fails, the unit will flash the LED sequence indicating that a download is required.

The following describes the I/O operating modes. The COM-adapter will not support peer cop or global data. The COM-adapter has three groups of internal registers: module data, configuration, and status. All three register groups can be accessed over the Ethernet network by standard Modbus commands to ensure compatibility with existing devices (i.e., user logic MSTR block). The COM-adapter will restrict write access to the first node that communicates with it. The COM-adapter will maintain this lockout until communication with the master times out. The COM-adapter will allow the master to specify up to three other "owners" in order to facilitate the efficient implementation of hot standby systems. The user can access various registers to obtain I/O module information via the Ethernet network. These internal registers are mapped to emulate 4xxxx registers allowing read/write 4xxxx register commands to be used (i.e. by using a MSTR block).

Below is a Table to show data flow between the Ethernet network and the COM-adapter internal registers:

|  | Data Group | Offset in Hex | Size of Field |
| --- | --- | --- | --- |
| Read Only | Input Data | 0001 | Module dependent |
| Write Only | Output Data | 0001 | Module dependent |
|  | Configuration Group | Offset in Hex | Size of Field |
| Read/Write | Time-out Register | F001 | 1 word |
| Read/Write | Reserved for IO Distributed | F201-F3FF | (See program listing). |
| Read/Write | Ownership Register | F401 | 6 words |
| Read/Write | IP Parameter Save Register | F410 | 1 word |
|  | Status Group | Offset in Hex | Size of Field |
| Read Only | Status register | F801 | word 1 of status register |
| Read Only | Module ASCII header | FC01 | word 6 of status register |

Data group information is as follows: The input buffer scheme captures a snap shot of all input data The output buffer scheme insures that the newest copy of output data (only one buffer) is written to the output modules. A special algorithm is also used to insure old data is not lost, during a single word update of a multiple word output buffer field.

Configuration group registers are as follows: The configuration group contains three registers that are used by the COM-adapter: a module hold-up time register, a write privilege register, and a save IP parameter register. A block of registers in this area is reserved for use by distributed I/O.

Module hold-up: Module hold-up time-out is the amount of time the output modules are held in their current state without being updated by Modbus write commands. The module time-out is one word at offset F001. This register can be read from and written to using Modbus commands, and the default value is 100 (1 sec.). The module time-out word is in increments of 10 msec, with a minimum value of 30 (300 msec) and a maximum value of 6,000 (60 sec.). All values outside this range will be logged as illegal data address errors. Write access is restricted to the current "master."

Another timer is the reservation time-out. The COM-adapter is dedicated to one Ethernet device. Reservation time-out is the amount of time (60 seconds) that the output module will be dedicated to an Ethernet device that is no longer communicating with it. If the time-out expires the COM-adapter will be dedicated to the next Ethernet device that writes to it. If two Ethernet devices wanted to write data to the same COM-adapter, one Ethernet device would have to wait for the reservation time-out to expire before it could write its data. This time-out is a fixed value, preferably sixty seconds, and is not user accessible (not changeable).

Ownership register: the Ownership register is used so that more than one Modbus device can have write access to the COM-adapter. Up to three remote Ethernet devices can have write access at the same time. This special case overrides the reservation time limit. The ownership register is six words starting at location F401, two words for the IP address of each Ethernet device. The default setting for each ownership register is zero (no owner). Register F401 contains the first owner's IP address, register F403 the second owner's IP address, and F405 contains the third owners IP address. All three owners have the same write privileges. A fourth controller (Ethernet device) could write to the COM-adapter if the three known owners (Ethernet devices) had ceased communication for more than the reservation time-out of sixty seconds.

IP Parameter Save Register: this boolean register is located at offset F410 and determines the behavior of the COM-adapter if a BOOTP server is not found at initialization time. If a one is written to the register, the current values of the IP parameters will be written to non-volatile storage (memory). If a BOOTP server cannot be found during the next initialization, these values will be used. If a zero is written to this register, any saved IP parameters will be erased. A change of state of this register will cause a reset of the COM-adapter. Writing the IP Parameter Save Register is restricted to owner or owners (Ethernet devices).

MBP Status Group registers: there are two registers in the Status Group: The internal status register starts at offset F801, and the ASCII header register starts at offset FC01.

Module (COM-Adapter) Status register:
The following table shows the contents of the Module status register:

| Words of information | Description | Value |
|---|---|---|
| Word 1 | Number of status words | Max. of 13 words |
| Word 2 | number of module input bytes | Module dependent |
| Word 3 | number of module output bytes | Module dependent |
| Word 4 | Module ID number | Module dependent |
| Word 5 | Module revision number | XR |
| Word 6 | ASCII header length in words | Module dependent |
| Word 7 | last node to communicate low word | IP Address |
| Word 8 | remaining reservation time | X |
| Word 9 | remaining module holdup time | X |
| Word 10 | Module health | 8000hex = good health |
| Word 11 | Last I/O module error | X |
| Word 12 | I/O module error counter | X |
| Word 13 | last node to communicate | IP Address |

For the purpose of this chart:

X=upper four bits reserved for station management commands, the upper 4 bits in this word will always be zero; R=(module revision number) REV 1.00=100 hex.

ASCII header block: there is an ASCII header block starting at offset FC01. This header is used to give a brief description of the module. The length of this block can be between one to sixty-four bytes. The length is contained in word six of the status register. This area is read only.

Compatibility: the COM-adapter is compatible to the ATI-interface and will function with all I/O bodies which operate according to the ATI-interface as described in U.S. patent application Ser. No. 09/036,565.

MTBF quality specification: the mean time between failure (MTBF) reliability calculation model is based on MIL__ HDBK-217 (a military standard). MTBF=1/failure rate. The specified value is calculated at 30 degrees C., GB (ground benign). The MTBF goal is 200,000 hours.

Performance: the communication stack is optimized to get the best possible performance for Modbus response time (time to issue a response after receiving a Modbus TCP request). The COM-adapter will support a MODBUS/TCP transaction rate of one per millisecond, providing a response to function code 23 for a simple 32 bit (2 word) in/out module in 500 micro-seconds. A master can recover from a TCP disruption by closing and reopening socket connection. This sequence will take no longer than 5 milliseconds due to delays at the COM-adapter.

Electrical specifications:
For the ATI-interface:
Logic supply Vcc :5V/+−5%/500ma Max supplied from the I/O body to the interface., Levels, load, and timing will be according to other ATI-interface specifications.
For the Ethernet-interface:
Compliant with the STP 100 ohm connection.

| | |
|---|---|
| 5 V Tolerance | +/− 5% |
| 5 V Current Consumption | 200 MA max.; @ < 100uF Capacitive Load |
| Processor | AMD186ER |
| Memory | 128K byte EPROM, 32K byte SRAM |
| Ethernet Controller | Crystal CS8900 |

EMC Requirements: The COM-adapter should meet EMC tests described in the applicable standards. The COM-adapter is considered as open equipment, which means it should be within an enclosure. The following tests can be performed with shielded cable:

| Standard | Test Description | Applicable Port | TOP HAT (COM-adapter) OPEN EQUIPMENT Parameters/Limits | |
|---|---|---|---|---|
| EN 55011 | Radiated Interference | Enclosure | Class A | |
| EN50140/ IEC 1000-4-3 | Radiated RF immunity | Enclosure | 80–1000 10 | Mhz V/m |
| EN50140 | Radiated RF impulse immunity | Enclosure | 900 10 | Mhb V/m |
| IEC 1000-4-2 Note | Electrostatic Discharge | Enclosure | 8 4 | kV Air kV contact |
| ENV50141/ IEC 1000-4-6 Note 1 | Conducted RF immunity | COM Port | .15–80 10 | MHz Vrms |
| IEC 1000-4-4 | Fast Transient Burst | Comm. lines | 1 | kV cap. Clamp |
| ENV 50142/ IEC1000-4-5 | Surges | Earth Port (shield) | 2 | kV CM |
| IEC 1131 par 4.7.2 | Protective Earth Continuity | Connector to Earch | 30 <0.1 | A Ohms |

Communication ports pass/fail criteria B is acceptable

The COM-adapter should meet the following agency standards:

U.L. 508, 746C, 94.

IEC1131-2 (where applicable)

CSA22.2 No. 142

CE Mark

FM Class 1 Div. 2

The COM-adapter in operation should be kept within the following ranges:

| | |
|---|---|
| Temperature | 0–60 degrees C. operating |
| | −40–+85 degrees C. storage |
| Humidity | 5–95% RH (non-condensing) |
| Vibration | 10–57 Hz @ 0.075 mmd.a |
| | 57–150 Hz @ 19 |
| Shock | +/− 15 G peak, 11 ms, half sine-wave |

The COM-adapter can have 2 LEDs, and use Ethernet shielded or unshielded RJ45 female connector. Shielding should be provided on 360°, and good contacts should be provided with the external metallic parts of the RJ45 male connector. The Ethernet RJ45 pin out is:

Pin 1: TX+

Pin 2: TX−

Pin 3: RD+

Pin 4: RD−

Modbus: the COM-adapter will accept MODBUS messages over TCP/IP using the MBAP protocol to communicate with certain boards. Modbus function codes 9 (read registers), 16 (write multiple registers) and 23 (read/write) will be processed by the software (See Appendix A), which is attached hereto, and which is incorporated by reference herein, and passed to the ATI interface. Message 8, sub-function 21 (get/clear statistics), will return Ethernet statistics similar to the NOE2X1. Modbus 125 commands will be processed by the kernel for executive download. The COM-adapter will respond to all other Modbus messages with exception code 01 (illegal function).

TCP/IP: the COM-adapter will run an optimized communication stack. This stack will enable the COM-adapter to respond to Modbus messages with minimum turn around time. It must also handle other network traffic, such as ARP requests and ICMP echo requests, in a manner consistent with the associated protocols. The COM-adapter will receive its network parameters from a BOOTP type server or use those retained in nonvolatile storage, if available.

The Modbus handler will field requests from the network and either respond directly or pass the request to the ATI interface. The handler will maintain the internal configuration and status registers, and arbitrate write access to the COM-adapter.

The TCP/IP communication stack should be optimized for performance. However, these optimizations should not impair its ability to function as a standard TCP/IP node on an integrated network.

The kernel will provide basic services for the operation of the unit. These include timer services, resource management, interrupt handling and drivers for peripherals such as Ethernet controller. Initialization and fault handling will also be handled by this code.

The present application is being filed contemporaneously with a U.S. Patent Application Attorney Docket No. 401 P 129, both of which are, or will be, assigned to Schneider Automation, which other application is incorporated herein by reference to the extent necessary for the understanding of the present invention.

While the specific embodiments have been illustrated and described, numerous modifications come to mind without significantly departing from the spirit of the invention and the scope of protection is only limited by the scope of the accompanying claims.

We claim:

1. A method for providing a connection between a master device having a first protocol and an I/O device having a second protocol and an output, the method comprising the steps of:
   receiving over a transmission path a request message on a preregistered TCP port selected from a plurality of TCP ports;
   receiving the output from the I/O device;
   transmitting a response message from the I/O device over the transmission path in response to the request message, the response message correlating to the output of the I/O device; and
   limiting the request message and the response message to a length that is less than both a TCP transaction length and a maximum transmission unit limit and wherein an adapter operably connected between the master device and the I/O device converts the request and response messages to and from the protocols of the respective master and I/O devices.

2. The method of claim 1, further including the step of receiving the input request message on a TCP port number 502.

3. The method of claim 1, further including the step of ignoring a connection request received from a device other than the master device.

4. The method of claim 1, further including the step of discarding a message of unknown meaning received over the transmission path.

5. The method of claim 1, further including the step of closing the transaction path in response to an error.

6. The method of claim 1, further including the step of sending an address resolution protocol response if an internet protocol address encoded within the request message matches an internet protocol address associated with the I/O device.

7. The method of claim 1, further including the step of sending a connection confirmation over the transmission path in response to a TCP connection request.

8. An adapter for providing an interface between a master device and an I/O device having an output, the adapter comprising:
   a TCP port for coupling to the master device via a transmission path for receiving a request message;
   a connector for operable coupling to the I/O device for receiving the output of the I/O device; and,
   an interface circuit operably connected to the TCP port and the connector for transmitting a response message from the I/O device over the transmission path in response to the request message, the response message correlating to the output received from the I/O device is converted for communication with the master device and wherein the request message and the response message is limited to a length that is less than both a TCP transaction length and a maximum transmission unit limit.

9. The adapter of claim 8, wherein the TCP port is TCP port number 502.

10. The adapter of claim 8, wherein the interface circuitry ignores a connection request received over the transmission path by another TCP port.

11. The adapter of claim 8, wherein the interface circuitry discards a message of unknown meaning received by the TCP port.

12. The adapter of claim 8, wherein the interface circuitry closes the transaction path in response to an error received by the TCP port.

13. The adapter of claim 8, wherein the interface circuitry transmits an address resolution protocol response over the transmission path if an internet protocol address encoded with the request message matches an internet protocol address associated with the I/O device.

14. The adapter of claim 8, wherein the interface circuitry transmits a connection confirmation in response to a TCP connection request.

15. A method for providing a connection between a master device and an I/O device having an input, the method comprising the steps of:
   receiving over a transmission path a request message on a preregistered TCP port selected from a plurality of TCP ports;
   transmitting a response message from the I/O device over the transmission path in response to the request message;
   transmitting data from the master device to the input of the I/O device in response to the request message, the data being converted for communication with the I/O device; and
   limiting the request message and the response message to a length that is less than a TCP transaction length and a maximum transmission unit limit.

16. The method of claim 15, further including the steps of ignoring a connection request received from a device other than the master device, discarding a message of unknown meaning received over the transmission path, and closing the transaction path in response to a transmission error.

17. The method of claim 15, further including the step of sending an address resolution protocol response if an internet protocol address encoded within the request message matches an Internet Protocol address associated with the I/O device.

18. The method of claim 15, further including the step of sending a connection confirmation over the transmission path in response to a TCP connection request.

* * * * *